United States Patent [19]
Lantto

[11] Patent Number: 5,724,664
[45] Date of Patent: *Mar. 3, 1998

[54] METHOD FOR SIGNALLING IN A TELECOMMUNICATION SYSTEM

[75] Inventor: Sven Jörgen Lantto, Tullinge, Sweden

[73] Assignee: Telefonaktiebolaget LM Ericsson, Stockholm, Sweden

[*] Notice: The term of this patent shall not extend beyond the expiration date of Pat. No. 5,557,655.

[21] Appl. No.: 193,845

[22] Filed: Feb. 9, 1994

[30] Foreign Application Priority Data

Feb. 10, 1993 [SE] Sweden ................................ 9300430

[51] Int. Cl.⁶ .................................................. H04Q 7/22
[52] U.S. Cl. ............................................ 455/560; 455/414
[58] Field of Search ............................. 379/58, 59, 63; 455/33.1, 54.1, 414, 412, 560

[56] References Cited

U.S. PATENT DOCUMENTS

| | | | |
|---|---|---|---|
| 4,347,607 | 8/1982 | Nixon et al. | 370/110 |
| 5,007,080 | 4/1991 | MacMillan et al. | |
| 5,301,359 | 4/1994 | Heuvel | 455/54.1 X |
| 5,428,665 | 6/1995 | Lantto | 379/58 |
| 5,557,655 | 9/1996 | Lantto | 379/58 |

FOREIGN PATENT DOCUMENTS 0 250 075   12/1987   European Pat. Off. .

OTHER PUBLICATIONS

CCITT Blue Book, vol. VIII, Fascicle VIII. 4, Recommendation X.219: "Remote Operations: Model, Notation and Service Definition", Melbourne 1988, pp. 465–502.
PCT International–Type Search Report mailed on Nov. 1, 1993 in connection with Swedish national Application No. 9300430.

*Primary Examiner*—Dwayne Bost
*Assistant Examiner*—William G. Trost
*Attorney, Agent, or Firm*—Burns, Doane, Swecker & Mathis, L.L.P.

[57] ABSTRACT

In a telecom system including a mobile telecom system having mobiles and mobile services switching centres, signalling between a mobile station and a mobile services switching centre with regard to handling operations of interest to supplementary services is performed by the aid of a support functionality in the mobile services switching centre. Upon receipt of an invoke component in an operation invoked by the mobile station, the support functionality analyzes the component in order to identify the corresponding supplementary service operation and a receiving supplementary service of the requested supplementary service operation. The support functionality then performs a syntax check on the data included in the component and specific to the operation in question, and, on request of the supplementary service, sends a response to the mobile station that has invoked the operation. In case of request of a supplementary service in the mobile services switching centre, which desires to send an invoke component regarding a supplementary service operation to a mobile station, the support functionality allocates an identification value for the operation and sends the component in a relevant message to the mobile station.

17 Claims, 3 Drawing Sheets

FIG. 1

METHOD FOR SIGNALLING IN A TELECOMMUNICATION SYSTEM

BACKGROUND

The present invention generally relates to signalling between mobile stations and mobile services switching centres in a telecommunication system where the functionality is separated into basic functionality and supplementary functionality.

More particularly, and according to one aspect, the present invention relates to a method in a Global System for Mobile Communications (GSM) network for implementing in a mobile services switching centre signalling towards mobile stations, with respect to supplementary services.

In modern telecommunication systems the functionality is separated into basic functionality and supplementary functionality. The basic functionality typically can include basic services which are common to many markets whereas the supplementary functionality can comprise supplementary services which may be chosen separately in each market.

The supplementary services have the character of constituting a supplement to a basic service or modifying it. The above mentioned signalling includes signalling performed for a certain call, also called call related signalling, and also signalling performed independently of a call, also called non-call related signalling.

Call related signalling for supplementary services relates to the signalling performed between a mobile station and a mobile services switching centre for commonly controlling supplementary services. This may, for example, involve a request from a mobile station to a mobile services switching centre for setting up a conference call.

Non-call related signalling for supplementary services relate primarily to the procedures used by a mobile station in GSM for either changing data for supplementary services or for asking the network about current data for supplementary services. This may, for example, imply activation of a supplementary service, recording data for a supplementary service, inquiry regarding data for a certain supplementary service, etc.

In the signalling between a mobile station and a mobile services switching centre the supplementary service procedures are implemented in a protocol, in which all procedures are specified as operations. These operations are descriptions of what the forward and back messages included in the procedure itself look like with respect to their contents in the protocol. The forward and back messages included in an operation are called components.

In the protocol between a mobile station and a mobile services switching centre it has been defined that these components can be sent in certain call related messages and messages for non-call related supplementary service procedures. For this purpose there has been defined an auxiliary information element designated "facility information element", which is included in the call related messages which can carry data for supplementary services, and all non-call related messages for supplementary services. Information element is the designation of the parameters included in a message between a mobile station and a mobile services switching centre. Facility information element is designed so as to be able to carry an arbitrary number of components which can belong to different operations.

An important property in operations for supplementary services is that each operation is identified by means of an operation code. This operation code includes a value to which a certain operation corresponds. The value is specified in the protocol where the operations are specified. For being able to identify the receiver of a supplementary service operation, i.e. a supplementary service, it is normally enough to know the operation code. There are, however, a number of exceptions to this rule where it is also necessary to analyze a further parameter, called "SS-code, which is an abbreviation for "Supplementary Services Code". This identifies a certain supplementary service. To sum up, the receiver of a supplementary service may be identified after analysis of operation code, and in exceptional cases, also the SS-code.

Since generally all supplementary services in GSM add new operations, which shall be signalled between a mobile station and a mobile services switching centre it is very important in a mobile services switching centre to be able to separate the handling of the operations of interest for the supplementary services and the components of which are included in facility information element, from the handling of other information elements, which are related to basic call functions. This admits implementing basic functions separately from supplementary services.

European Patent document EP 250 075 describes a method for managing a data link in an ISDN-network. The signal format for ISDN consists of two B channels and a D channel. The B channels are used for speech and data communication whereas the D channel is used for transferring data needed to maintain a dialogue. The method relates to the handling of data arriving in the D channel. Said data are separated and distributed by a D channel handler by means of a "translator" via a buffer.

U.S. Pat. No. 4,347,607 describes a method for separating speech and alarm signals from data signals. The document states how to use channels usually used for data traffic for invoking and transferring speech and alarm signals. On the receiver side these signals are separated from the data traffic and decoded for then being sent to the right destination.

SUMMARY

One object of the present invention is to provide a method for generally solving the problem of separating the handling of operations of interest for the supplementary services from the handling of other information elements related to the basic call functions.

The solution shall admit that new operations and influence on existing operations may be included in a mobile services switching centre without affecting the functions terminating the protocol for signalling between a mobile station and a mobile services switching centre. New supplementary services shall not affect the basic functions if they introduce new operations between a mobile station and a mobile services switching centre. The contents in the supplementary service operations may neither affect the basic functions but only the supplementary services which terminate the supplementary service operations.

The solution admits handling of a supplementary service operation for call related as well as non-call related supplementary procedures.

Generally, in accordance with the invention, the mobile services switching centre uses a support functionality as an aid for signalling between a mobile station and the mobile services switching centre with regard to handling operations of interest to supplementary services. At receipt of an invoke component in an operation invoked by the mobile station, the support functionality analyzes said component for identifying the corresponding operation and a receiving supplementary service of a requested supplementary service operation. The support functionality then performs syntax check on the data included in the component and specific to the operation in question, and sends on request of the supplementary service a response to the mobile station that has invoked the operation. In case of request of a supplementary service in the mobile services switching centre, which desires to send an invoke component regarding an operation to a mobile station, the support functionality allocates an identification value for the operation and sends the component in a relevant message to the mobile station.

More specifically, and according to one aspect, the invention includes a method for performing signalling between a mobile station and a mobile services switching centre with regard to handling operations of interest to supplementary services, wherein supplementary service procedures, being descriptions of forward and back message information components, are defined by a protocol by means of rules specifying said procedures as operations, said components including data specific to an operation and only known within a corresponding supplementary service, and each operation in a supplementary service is identified by an operation code included in each forward message information component and including a value to which corresponds a certain operation and which is specified in said protocol and normally identifies a supplementary service receiving a supplementary service operation, said method comprising using a support functionality in the -mobile services switching centre for performing the steps of analyzing, at receipt of a forward message information component in an operation invoked by the mobile station, said component for identifying the value of operation code included therein and thereby the corresponding operation and a receiving supplementary service of a requested supplementary service operation, performing syntax check on the data included in said component specific to the operation in question and only known within said identified receiving supplementary service, giving said component to said supplementary service, sending on request of the supplementary service a response to the mobile station that has invoked the operation.

According to another aspect, the invention includes a method for performing signalling between a mobile station and a mobile services switching centre with regard to handling operations of interest to supplementary services, wherein supplementary service procedures, being descriptions of forward and back message information components, are defined by a protocol by means of rules specifying said procedures as operations, said components including data specific to an operation and only known within a corresponding supplementary service, and each operation in a supplementary service is identified by an operation code included in each forward message information component and including a value to which corresponds a certain operation and which is specified in said protocol and normally identifies a supplementary service receiving a supplementary service operation, said method comprising using a support functionality in the mobile services switching centre for performing on request of a supplementary service in a mobile services switching centre, which desires to send a forward message information component regarding an operation to a mobile station, the steps of allocating an identification value for the operation, sending said component in a relevant message to the mobile station.

According to a further aspect the invention includes a method for performing signalling between a mobile station and a mobile services switching centre with regard to handling operations of interest to supplementary services, wherein supplementary service procedures, being descriptions of forward and back message information components, are defined by a protocol by means of rules specifying said procedures as operations, said components including data specific to an operation and only known within a corresponding supplementary service, and each operation in a supplementary service is identified by an operation code included in each forward message information component and including a value to which corresponds a certain operation and which is specified in said protocol and normally identifies a supplementary service receiving a supplementary service operation, said method comprising sending said components included in auxiliary information elements in call related messages for commonly controlling supplementary services, and in messages for non-call related supplementary service procedures, said auxiliary elements being able to carry an arbitrary number of components belonging to different operations, using a support functionality in the mobile services switching centre for A) analyzing at receipt of an auxiliary information element in the mobile services switching centre, in an operation invoked by the mobile station, said auxiliary information element for identifying a forward message information component included therein, analyzing said forward message information component for identifying the value of operation code included therein and thereby a receiving supplementary service of a requested supplementary service operation, performing syntax check of the data included in the identified operation specific to the operation in question and only known within said identified receiving supplementary service, giving said component to said supplementary service, sending on request of the supplementary service a response to the mobile station that has invoked the operation, B) performing on request of a supplementary service in a mobile services switching centre, which desires to send a forward message information component regarding an operation to a mobile station, the steps of allocating an identification value for the operation, incorporating this component in said auxiliary information element, sending it in a relevant message to the mobile station, analyzing, in case a response arrives from the mobile station in the form of back message information component included in the auxiliary information element, said operation identification value in said back message information component for identifying the service that invoked the operation, and sending said received component to the service thus identified.

BRIEF DESCRIPTION OF THE DRAWINGS

The invention will now be described in more detail with reference to the enclosed drawings, in which.

DETAILED DESCRIPTION

Figure 1:
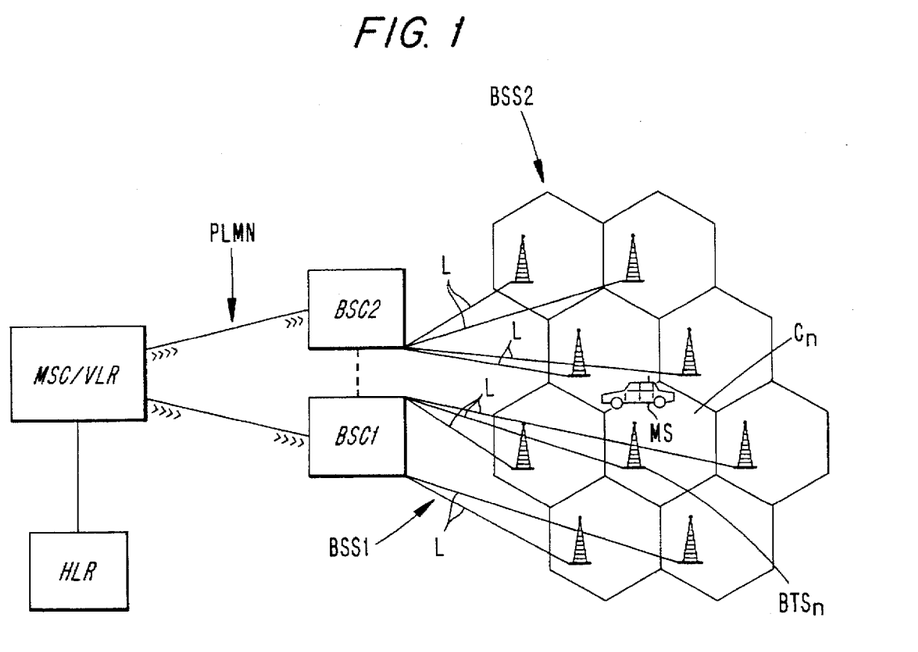
FIG. 1 is a schematic diagram illustrating the basic structure of a GSM network.

With reference to FIG. 1, a GSM cellular network basically comprises a number of base station systems, of which two are generally indicated at BSS1 and BSS2, respectively. Each of the base station systems BSS1 and BSS2 includes a base station controller BSC1 and BSC2, respectively, connected to base station transceivers (BTS) via communication links L, one of said base station transceivers being designated BTS.n in FIG. 1. Each transceiver BTS is located in an associated cell of the cellular network, which is shown in FIG. 1 as a honeycomb structure wherein each hexagon represents a cell. In FIG. 1 the cell containing the transceiver BTS.n is designated C.n. The GSM network furthermore includes a mobile service switching centre (MSC) having a visitors location register (VLR). There are furthermore one or more home location registers (HLR) communicating with the MSC. The MSC is connected for communication with the base station controllers BSC1 and BSC2 via a public land mobile network (PLMN).

Although not shown, the MSC shown in FIG. 1 usually has an interface to other MSCS, each MSC having furthermore interfaces for connection to a local public switched telephone network, not shown.

Each subscribing mobile station MS belongs to a HLR in a home network, wherein permanent subscriber data is stored. When a mobile station is registered in a MSC/VLR as a new visitor, that mobile station's HLR sends a copy of the relevant subscriber data to MSC/VLR.

The specification of GSM 04.80 contains a description of the protocol for communicating between a mobile station and an MSC.

In a modern telecommunication system of the kind in which a GSM cellular network as outlined above may be included, the functionality is separated into basic functionality and supplementary functionality. The basic functionality typically can include basic services which are common to many markets whereas the supplementary functionality can comprise supplementary services which may be chosen separately in each market.

The supplementary services have the character of constituting a supplement to a basic service or modifying it.

The signalling between a MS and MSC/VLR includes signalling performed for a certain call, also called call related signalling, and also signalling performed independently of a call, also called non-call related signalling.

Call related signalling for supplementary services relates to the signalling performed between MS and MSC/VLR for commonly controlling supplementary services. This may, for example, involve a request from MS to MSC/VLR for setting up a conference call.

Non-call related signalling for supplementary services relate primarily to the procedures used by a MS in GSM for either changing data for supplementary services or for asking the network about current data for supplementary services. This may, for example, imply activation of a supplementary service, recording data for a supplementary service, inquiry regarding data for a certain supplementary service etc.

In the signalling between MS and MSC/VLR the supplementary service procedures are implemented in a protocol by means of rules according to the concept for "ROSE" which is an abbreviation for "Remote Operations Service Element"—specified in CCITT X.219 and X.220 which are incorporated herein by reference. This implies that all procedures are specified as operations in the protocol. These operations are descriptions of how forward and back messages included in the procedure itself look with respect to their contents in the protocol. The forward and back messages included in an operation are called components.

In the protocol between MS and MSC/VLR it has been defined that these components can be sent in certain call related messages and messages for non-call related supplementary service procedures. For this purpose there has been defined an auxiliary information element designated "facility information element", below in short called "facility IE, which is included in the call related messages which can carry data for supplementary services, and in all non-call related messages for supplementary services. More particularly facility IE is described in CCITT Q.932 which is incorporated herein by reference. "Information element" is the designation of the parameters included in a message between MS and MSC/VLR. Facility IE is designed so as to be able to carry an arbitrary number of components which can belong to different operations.

An important property in operations for supplementary services is that each operation is identified by means of an operation code. This operation code includes a value to which a certain operation corresponds. The value is specified in the protocol where the operations are specified. For being able to identify the receiver of a supplementary service operation, i.e. a supplementary service, it is normally enough to know the operation code. There are, however, a number of exceptions to this rule where it is also necessary to analyze a further parameter, called "SS-code, which is an abbreviation for "Supplementary Services Code". This identifies a certain supplementary service and is described in GSM 09.02 which is incorporated herein by reference. To sum up, the receiver of a supplementary service operation may be identified after analysis of the operation code, and in exceptional cases, also the SS-code.

Since generally all supplementary services in GSM add new operations, which shall be signalled between MS and MSC/VLR it is very important in the MSC/VLR to be able to separate the handling of the operations of interest for the supplementary services and the components of which are included in facility IE, from the handling of other information elements, which are related to basic call functions. This admits implementing basic functions separately from supplementary services.

The invention involves a general way of handling in MSC/VLR facility IE which, as has been mentioned earlier, carries the components carrying data for supplementary services, by providing therefor a general support functionality for supplementary services in the form of a code based upon GSM specifications. Henceforth below this support functionality will be called "FS" which is an abbreviation for "Facility Support". According to one embodiment of the invention it is possible to distinguish between two subfunctions of this support functionality, below called subfunction A and subfunction B, respectively. Subfunction A relates to support for operations invoked by an MS, and subfunction B relates to support for operations invoked by an MSC/VLR. The subfunctions A and B will be individually described below in more detail.

Subfunction A

When receiving a component of the type invoke, i.e. the forward message in an operation, in MSC/VLR, which occurs for operations invoked by MS, the main function of FS is to identify the supplementary service which besides receiving this invoke component also shall send back a positive or negative response to the MS. This is performed such that the received invoke component is analyzed, through an analytic check of the format in order to enable identification of the value for the above mentioned operation code.

Operation code is represented in all invoke components in the same location, meaning that this occurs the same way for all operations. For operations where operation code is not enough for identifying the right supplementary service, also the first parameter appearing after operation code is analyzed, which is the above mentioned parameter SS-code and explicitly identifies the right supplementary service.

Figure 2A:
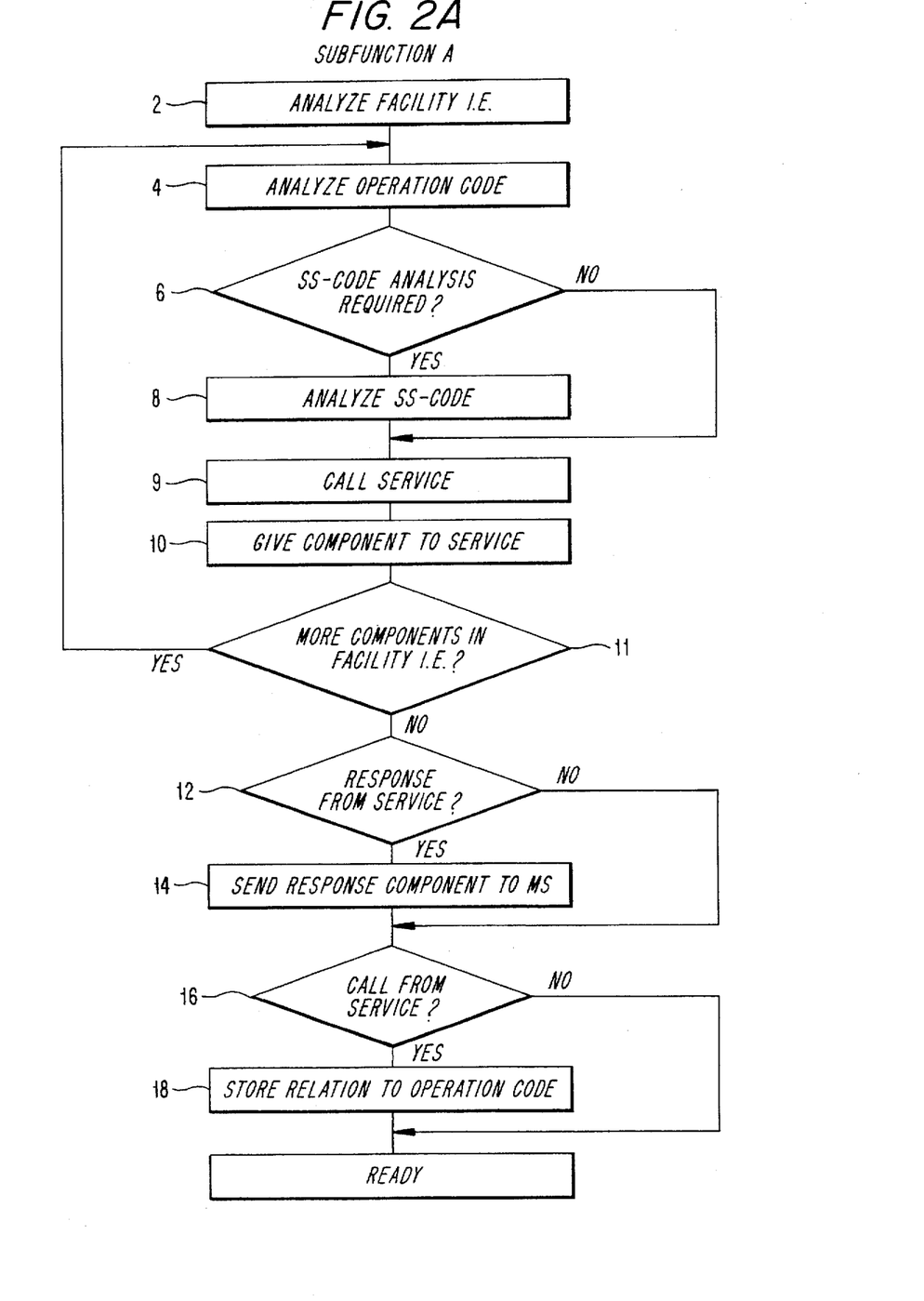
FIGS. 2a and 2b are flowchart representations of an embodiment of the method according to the invention.

With reference to FIG. 2a, in step 2 FS performs an analysis of facility IE for identifying the invoke component. In step 4 FS analyses the invoke component for identifying the value of operation code included therein and thereby a receiver, i.e. a receiving supplementary service, of a requested supplementary service operation.

In step 6 FS establishes whether analysis of the parameter SS-code is also required. If yes, FS analyses SS-code in step 8. Otherwise step 8 is omitted. The analysis, either it only needs to be performed according to step 6, or also according to step 8, involves that the receiver of the right supplementary service may be identified. By FS being provided with a list for filling in operation code and the service owning it, the analysis may furthermore have the property of allowing involving new supplementary services as a result of the analysis without affecting the analysis itself. In this case it is possible to introduce new operation codes into the analysis and in that way identify new supplementary services.

When the right supplementary service has been identified by FS, the service is called in step 9 and requests to obtain access to the relevant invoke component. In step 10 the invoke component is given to the service. The supplementary service will now perform syntax check on the data included in the invoke component which are specific for this operation. These data are only known within the supplementary service.

In step 11 FS establishes whether there are more invoke components in facility IE, and will repeat the identification of the right receiver of components according to steps 4, 6 and 8 until all receivers have been identified and have received a relevant component, in cases where more than one component was included in facility IE.

FS now allows the supplementary services which have received invoke components to respond to these. In step 12 FS establishes whether a response has been received from the service. If yes, this appears by the supplementary service informing FS that it wants to send an answer to MS. When this request appears FS will send a response component in a relevant message to MS in step 14.

The response, which will be based upon the result of the syntax check, can occur in three different forms, "return result" which is a positive answer, "error" which informs that the operation cannot be carried through, and "reject" involving that the operation was not correctly syntactically formulated. The relevant response component is formulated by the supplementary service itself, meaning that FS need not know the answers included in a certain operation—this is only known to the receiver of the operation, i.e. the supplementary service performing that requested by the operation. The result is that FS will not be affected by e.g. new error events being introduced within the operation. These error events may still be supplied to MS without affecting any function in MSC/VLR other than the supplementary service. If it turns out in step 12 that no response has been received from the service, step 14 will be omitted.

In step 16 FS establishes whether there is a call from a service. If yes, FS in step 18 stores information regarding the service owning the respective code or, alternatively, the combination of operation code and SS-code. If no, step 16 is omitted.

Subfunction B

Figure 2B:
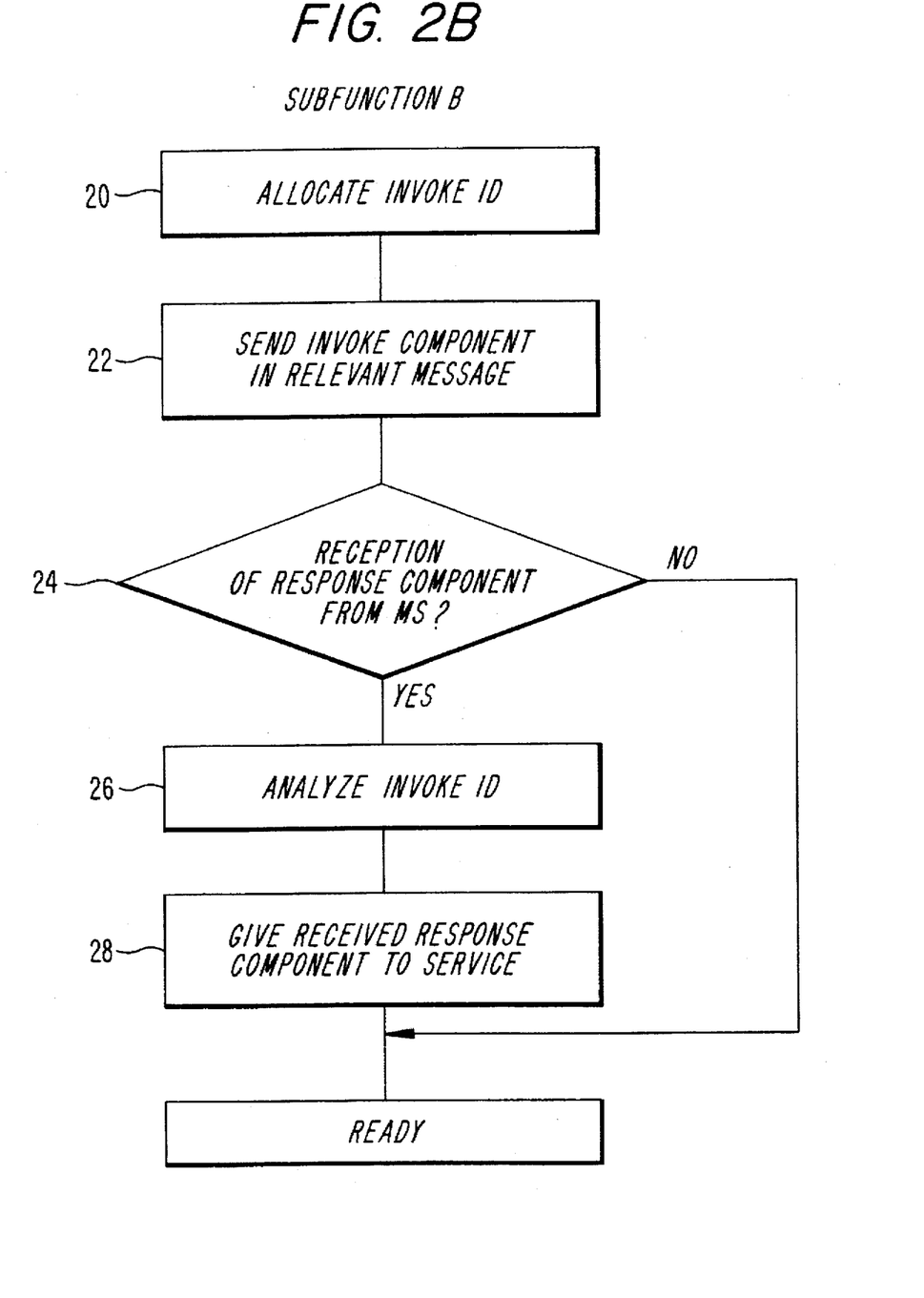

As regards support for operations invoked by supplementary services in MSC/VLR this works somewhat differently in FS. If a supplementary service wants to send an invoke component to MS this shall first be syntactically formulated by the supplementary service itself, i.e. it shall format the component in question with the included parameters. The supplementary service then asks FS that this component shall be sent in a relevant message, which includes facility IE. FS will now, in step 20, allocate a value invoke ID, which is described below, and arrange that this invoke component will be included in facility IE, and, in step 22, be sent in a relevant message to MS.

For handling this it is required that it is always FS that assigns invoke ID to the service for operations invoked by MSC/VLR. Invoke ID is described in CCITT X.219 and is a value assigned for each active operation, which is used for being able to separate different operations of e.g. the same type from each other. The assignment of invoke ID in FS occurs at request of invocation of an operation from the supplementary service.

In step 24 FS establishes whether a response has arrived from MS in MSC/VLR which, according to the protocol based upon "ROSE", shall include invoke ID. If yes, the response will be in the form of a response component, which is included in facility IE. FS analyses invoke ID in step 26 and in step 28 supplies the response component to the supplementary service which has requested invocation of an operation. Since it is FS that knows the connection between invoke ID and the supplementary service, the received response component, which always includes the same invoke ID as has been assigned to invoke component, can be related to the supplementary service which has invoked the operation.

This admits a solution of the case where more mutually independent supplementary services request invocation of the same or different supplementary services at the same time.

If in step 24 FS establishes that no response component has been received from MS, steps 26 and 28 are omitted.

Summarizing, the invention provides a method which admits adding new supplementary services in MSC/VLR which include new specific operations without this affecting the functions normally terminating the protocol between MS and MSC/VLR.

The solution involves that new operations can be added and existing operations can be changed without this affecting any other function in MSC/VLR than the supplementary services which are the primary receivers/senders of these operations.

What is claimed is:

1. In a telecommunications system including a mobile telecommunications system comprising a mobile station and a mobile services switching center, the mobile station and the mobile services switching center each including means for communicating with one another, a method for performing supplementary service signalling between the mobile station and the mobile services switching center, comprising the steps of:

in the mobile services switching center, using a support functionality to perform the steps of:

receiving a forward message information component from the mobile station, the forward message information component including:

an operation code identifying a receiving supplementary service and including a value to which a supplementary service operation of the receiving supplementary service corresponds; and supplementary service data in correspondence with the supplementary service operation;

analyzing the received forward message information component to determine the operation code, and thereby determine the receiving supplementary service and the corresponding supplementary service operation;

checking syntax of the supplementary service data;

giving the received forward message information component to the receiving supplementary service; and sending a response to the mobile station in response to a request made by the receiving supplementary service.

2. The method according to claim 1, wherein the step of analyzing further comprises analyzing the received forward message information component to determine a parameter explicitly identifying the receiving supplementary service.

3. The method according to claim 1, wherein components are included in auxiliary information elements that are alternatively sent in call related messages that carry data for supplementary services, or in messages for non-call related supplementary service procedures, wherein said auxiliary information elements are able to carry an arbitrary number of components belonging to different operations, and wherein the step of receiving comprises receiving an auxiliary information element, and identifying in the received auxiliary information element a received forward message information component included therein.

4. The method according to claim 1, wherein the step of analyzing utilizes a list for correlating an operation code with a supplementary service, whereby performance of the analyzing step is unaffected by whether or not a new operation code, identifying a new receiving supplementary service, is included in the received forward message information component.

5. The method according to claim 3, further comprising the steps of determining whether the received auxiliary information element contains more than one forward message information component, and if so, repeating the step of analyzing for each forward message information component contained in the received auxiliary information element.

6. The method according to claim 1, wherein the step of sending comprises forming the response alternatively as a positive response, a message that the corresponding supplementary service operation cannot be carried through, or a rejection due to syntax of the supplementary service operation having not been correctly formulated.

7. The method according to claim 1, wherein the response is formed by the receiving supplementary service.

8. The method according to claim 1, further comprising using the support functionality to perform the steps of:

performing, in response to a request made by a supplementary service in a mobile services switching center, the supplementary service desiring to send a second forward message information component regarding a second supplementary service operation to the mobile station, the steps of:

allocating an identification value for the second supplementary service operation; and sending the second forward message information component in a message to the mobile station.

9. The method according to claim 8, further comprising the steps of:

receiving, from the mobile station, a response in the form of a back message information component;

determining that the received back message information component contains the identification value for the second supplementary service operation, thereby identifying the supplementary service that invoked the second supplementary service operation; and sending the received back message information component to the supplementary service that invoked the second supplementary service operation.

10. The method according to claim 9, further comprising the step of sending components included in auxiliary information elements in call related messages for commonly controlling supplementary services, and in messages for non-call related supplementary service procedures, wherein said auxiliary information elements are able to carry an arbitrary number of components belonging to different operations;

incorporating the second forward message information component in the auxiliary information element desired to be sent to the mobile station, and wherein the back message information component is included in a second auxiliary information element.

11. The method according to claim 10, wherein the step of allocating the identification value is repeated for each of the different operations.

12. In a telecommunications system including a mobile telecommunications system comprising a mobile station and a mobile services switching center, the mobile station and the mobile services switching center each including means for communicating with one another, a method for performing supplementary service signalling between the mobile station and the mobile services switching center, comprising the steps of:

in the mobile services switching center, in response to a request, made by a supplementary service in the mobile services switching center, the supplementary service desiring to send a forward message information component regarding a supplementary service operation to the mobile station, using a support functionality to perform the steps of:

allocating an identification value for the supplementary service operation; and sending the forward message information component in a message to the mobile station.

13. The method according to claim 12, further comprising the steps of:

receiving, from the mobile station, a response in the form of a back message information component;

determining that the received back message information component contains the identification value for the supplementary service operation, thereby identifying the supplementary service that invoked the supplementary service operation; and sending the received back message information component to the supplementary service that invoked the supplementary service operation.

14. The method according to claim 13, wherein components are included in auxiliary information elements that are alternatively sent in call related messages that carry data for supplementary services, or in messages for non-call related supplementary service procedures, wherein said auxiliary information elements are able to carry an arbitrary number of components belonging to different supplementary service operations;

incorporating the forward message information component in the auxiliary information element desired to be sent to the mobile station, and wherein the back message information component is included in a second auxiliary information element.

15. The method according to claim 14, wherein the step of allocating the identification value is repeated for each of the different supplementary service operations.

16. In a telecommunications system including a mobile telecommunications system comprising a mobile station and a mobile services switching center, the mobile station and the mobile services switching center each including means for communicating with one another, a method for performing supplementary service signalling between the mobile station and the mobile services switching center, comprising the steps of:

including forward and back message information components in auxiliary information elements that are alternatively sent in call related messages that carry data for supplementary services, or in messages for non-call related supplementary service procedures, wherein said auxiliary information elements are able to carry an arbitrary number of components belonging to different operations;

in the mobile services switching center, using a support functionality to perform the steps of:

receiving an auxiliary information element from the mobile station, and identifying in the received auxiliary information element a received forward message information component included therein, the forward message information component including:

an operation code identifying a receiving supplementary service and including a value to which a supplementary service operation of the receiving supplementary service corresponds; and supplementary service data in correspondence with the supplementary service operation;

analyzing the received forward message information component to determine the operation code, and thereby determine the receiving supplementary service and the corresponding supplementary service operation;

checking syntax of the supplementary service data;

giving the received forward message information component to the receiving supplementary service;

sending a response to the mobile station in response to a request made by the receiving supplementary service;

performing, in response to a request made by a supplementary service in a mobile services switching center, the supplementary service desiring to send a forward message information component regarding a second supplementary service operation to the mobile station, the steps of:

allocating an identification value for the second supplementary service operation and using the allocated identification value as part of the forward message information component;

incorporating the forward message information component in an auxiliary information element;

sending the auxiliary information element in a message to the mobile station;

receiving, from the mobile station, a response in the form of a back message information component;

determining that the received back message information component contains the identification value for the second supplementary service operation, thereby identifying the supplementary service that invoked the second supplementary service operation; and sending the received back message information component to the supplementary service that invoked the second supplementary service operation.

17. In a system including signalling between a mobile station and a mobile services switching center, wherein functionality in the system includes basic operations and supplementary service operations, a method of separating handling of supplementary service operations from handling of information elements related to basic call functions, wherein supplementary service procedures are defined in the signalling by means of a protocol having rules requiring that all supplementary service procedures be specified as operations that describe contents of forward message components and back message components, wherein the forward message components and back message components are included in an auxiliary information element that is sent alternatively in certain call related messages, or in messages for non-call related supplementary service procedures, wherein the auxiliary information element carries an arbitrary number of components belonging to different operations, each operation in a supplementary service being identified by an operation code including a value to which corresponds a certain operation, the value being specified in the protocol in which the operations are specified, said method comprising the steps of:

using a support functionality to perform the steps of:

in the mobile services switching center, performing the steps of:

receiving an invoke component from the mobile station;

analyzing the received invoke component to identify an operation code value, thereby identifying a supplementary service operation and a receiving supplementary service;

checking syntax of data included in the invoke component, the data corresponding to the supplementary service operation and conveying information to the receiving supplementary service;

giving the received invoke component to the receiving supplementary service;

receiving, in response, from the receiving supplementary service, a request to send a response to the mobile station; and receiving from a second supplementary service a syntactically formulated component, and in response, incorporating the syntactically formulated component in a first auxiliary information element and sending the first auxiliary information element in a message to the mobile station.

* * * * *